United States Patent
Xin et al.

(10) Patent No.: US 11,546,508 B1
(45) Date of Patent: Jan. 3, 2023

(54) POLARIZATION IMAGING SYSTEM WITH SUPER RESOLUTION FUSION

(71) Applicant: Black Sesame International Holding Limited, San Jose, CA (US)

(72) Inventors: Zhaowei Xin, Xuchang (CN); Chao Wang, Shanghai (CN)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/381,451

(22) Filed: Jul. 21, 2021

(51) Int. Cl.
*H04N 5/232* (2006.01)
*H04N 5/225* (2006.01)
*G06T 3/40* (2006.01)
*G06T 5/50* (2006.01)

(52) U.S. Cl.
CPC ....... *H04N 5/23232* (2013.01); *G06T 3/4053* (2013.01); *G06T 5/50* (2013.01); *H04N 5/2253* (2013.01); *H04N 5/2258* (2013.01); *G06T 2207/10052* (2013.01); *G06T 2207/20221* (2013.01)

(58) Field of Classification Search
None
See application file for complete search history.

(56) References Cited

U.S. PATENT DOCUMENTS

| 11,270,110 B2 * | 3/2022 | Kadambi | G06K 9/627 |
| 2015/0206912 A1 * | 7/2015 | Kanamori | H01L 27/14625 359/485.05 |
| 2021/0084206 A1 * | 3/2021 | McEldowney | H04N 13/25 |

FOREIGN PATENT DOCUMENTS

WO WO-2021071995 A1 * 4/2021 ............ B25J 9/1697

* cited by examiner

*Primary Examiner* — James M Hannett
(74) *Attorney, Agent, or Firm* — Timothy T. Wang; Ni, Wang & Massand, PLLC

(57) ABSTRACT

A polarization imaging system for generating a super resolution image is disclosed in the present invention. The polarization imaging system consists of multiple functional elements for the generation of the super resolution image including a camera device, a polarization analysis module, a weight module, a fusion module and an output module. The lens of the imaging system captures light coming from a subject which is detected and acted upon by a polarization sensor. The polarization sensor generates multiple low resolution images and calculates degree of linear polarization and angle of polarization of the light rays based on which a guided mask is generated. The system employs an algorithm to combine the one or more low resolution images to produce a final super resolution image as the output.

18 Claims, 8 Drawing Sheets

POLARIZATION IMAGING SYSTEM WITH SUPER RESOLUTION FUSION

FIELD OF INVENTION

The present invention relates to an imaging system. More particularly, the present invention relates to a polarization imaging system for generating a super resolution image.

BACKGROUND OF THE INVENTION

In digital photography, the conventional image sensor and human visual system can only be used to detect and convey the intensity and narrowband wavelength of light-waves into signals used to make an image. However, these completely lose the polarization information and limit the perception ability of imaging system. Light waves, which can be characterized by its amplitude, wavelength, phase and polarization. In contrast, the goal of polarization sensing is to simultaneously measure the amplitude and polarization of incoming optical field. Various visual systems in the animal kingdom including insects, fish, crustaceans and mantis shrimp are sensitive to the polarization information. The combination of polarization and intensity information enables a variety of tasks such as navigation, communication, and localization enhancing visual contrast of object against its background.

Polarization imaging technology has a wide range of applications in the fields of earth remote sensing, astronomical observation, target recognition, medical diagnosis and three-dimensional reconstruction. Natural light does not exhibit polarization characteristics. Natural light is uniformly distributed in all directions and has the same amplitude. For partially polarized light, the amplitudes of light waves in different polarization directions are different, and the amplitudes in two mutually perpendicular directions have maximum and minimum amplitudes. Therefore, some substances can be distinguished by the degree of polarization, such as the degree of polarization of natural substances and camouflage substances.

The principle of polarization imaging is: when natural light (unpolarized light) interacts with a substance, such as reflection, refraction, scattering, and absorption, the emitted light usually becomes partially polarized light or linearly polarized light. According to Kirchhoff's law and Fresnel's formula, the degree of polarization of the emitted light is directly related to the inherent properties of the material interface and the angle of reflection (or refraction angle). The inherent properties of the material interface include composition, structure, roughness, and content.

U.S. Pat. No. 9,426,362B2 assigned to MEMS Drive Inc. describes an image resolution enhancing technique. Application of the technology disclosed herein significantly enhances the resolution of an image captured by a camera with a limited image sensor size and a limited pixel density. However, the technology described does not make use of a polarization sensor inside the camera which helps in measuring physical properties that are not detectable using conventional imaging.

Another Chinese Patent 105551009A assigned to Habrin Institute of Technology overcomes the limitations of the above mentioned prior art to some extent. The prior art relates to an image interfusion method based on continuous Terahertz cofocus scanning polarization imaging. By employing image fusion involving image interpolation, the invention aims to enhance image quality. The invention overcomes the limitations of the US patent described earlier by introducing polarization imaging. The technology described offers numerous benefits, not only detecting geometry and surface, but measuring physical properties that are not detectable using conventional imaging. Also, the described technology can be used to enhance contrast for objects that are difficult to distinguish otherwise. However, one of the major disadvantages of the described invention is that for the process of interpolation and obtaining good picture quality, a large amount of points need to be taken which increases imaging time. In case of considering less amount points so as to reduce imaging time, the quality of the image obtained is compromised.

To overcome the shortcomings of the prior art mentioned above another Chinese patent 105139339A assigned to Chinese People's Liberation Army Officer Academy discloses a polarization image super-resolution reconstruction method based on multi-level filtering and sample matching. The invention uses polarization imaging and generates images with clear contour structure, less obvious jagged edges and rich information of details. However, the described invention lacks the technique of image fusion resulting in poor preservation of the spectral content of the image.

Thus, to overcome the disadvantages of the prior arts mentioned, a polarization imaging system for generating a super resolution image is disclosed in the present invention. The polarization imaging system of the invention employs the techniques of polarization imaging and image fusion to generate a super resolution image.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described.

SUMMARY OF THE INVENTION

Light waves can be characterized by their amplitude, wavelength, phase and polarization. Polarization of light is caused by the scattering of light in air by reflection or refraction from objects. This information is orthogonal to the other two fundamental properties of light: intensity and colour captured by a conventional image sensor.

Polarization is a fundamental property of light and describes the direction in which the electric field of light oscillates. The majority of light sources, such as the sun, emit unpolarized light. Unpolarized light has vibrations at randomly oriented directions perpendicular to the direction of travel. For light to be polarized randomly oriented vibrations are removed or transformed into either a linear, circular or elliptical electromagnetic wave.

Polarization imaging can provide rich information about our surrounding world which cannot be seen by conventional image sensor and human visual system. To simultaneously measure the amplitude and polarization of incoming optical field is the goal of polarization sensing. A polarization image sensor is able to extend the polarization perception ability of an imaging system. In the present invention, a polarization image fusion method to generate an enhanced super-resolution image using four low-resolution intensity images with different polarization direction is proposed.

Visual inspection can be challenging due to highly reflective imaging conditions in many industrial applications. Polarized cameras can help uncover hidden material properties and provide visual clarity over standard cameras. Polarization cameras can be used for filtering unwanted reflection or glare as well as enhancing contrast by colourizing polarized angles of light. Normal colour and mono sensors detect the intensity and the wavelength of incoming light whereas the special polarized sensors used inside polarization cameras can detect and filter angles of polarization from light reflected, refracted, or scattered off surfaces.

The primary objective of the present invention is to provide a polarization super-resolution system which includes a camera device, a polarization analysis module, a weight module, a fusion module and an output module that produces a super resolution image. The camera device includes a main lens system and a polarization image sensor. The polarization sensor used is a CMOS sensor that features a four-directional polarizer.

Light beam from a subject focused by the main lens system is recorded by the polarization image sensor. The amount of light into the camera is limited by the aperture of main lens of the camera. The focusing lens in the system may be formed by a flexible transparent elastic member or a liquid lens, and the refracting power of the focusing lens may be changed by changing its interface shape, so as to adjust a focus to an object. The imaging system may comprise a single focus lens, zoom lens, shift lens, or the like, or may be exchangeable to other photographing optical systems having various characteristics (f-numbers (aperture values), focal lengths, and the like).

Another objective of the present invention is to provide a polarization image sensor similar to a colour filter array consisting of arrayed pixels with different polarization direction. A close-up image of the polarization sensor shows the sensor having polarization pixels, A, B, C and D with four polarization direction. The arrayed pixels provide a per-pixel light modulation. The imaging system disclosed receives the raw data and extract four low-resolution images with different polarization direction.

Another objective of the imaging system is to calculate the degree of linear polarization (DOLP) and angle of linear polarization (AOLP) by the sub-images based on polarization analysis module. Degree of polarization (DOP) is a quantity used to describe the portion of an electromagnetic wave which is polarized. The light is reflected by the surface of the object in polarized and unpolarized lights. The degree of linear polarization of the reflected light depends on the surface condition (material, colour, roughness etc.) and the angle of reflection. The angle of polarization indicates the angle between the plane of polarization and the plane of reference.

A perfectly polarized wave has a DOP of 100%, whereas an unpolarized wave has a DOP of 0%. With the information of direction of polarization, both distortions and the direction of distortion of the plane can be identified and reflections can be removed. The weight module creates weight mask based on the guided map that is calculated by the DOLP/AOLP.

Yet another objective of the present invention is to provide an enhanced super resolution image with detail information with the help of the fusion module. The fusion module combines the one or more weighted sub-images obtained to generate the super resolution image. The fusion module then employs an algorithm to combine the one or more weighted sub-images by fusion imaging to produce a super resolution image wherein the fusion imaging is based on either a surface-reflection reduction or a surface normal mapping.

Another objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE FIGURES

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE FIGURES

Polarization cameras can be used for filtering unwanted reflection or glare as well as enhancing contrast by colourizing polarized angles of light. Normal colour and mono sensors detect the intensity and the wavelength of incoming light whereas the special polarized sensors used inside polarization cameras can detect and filter angles of polarization from light reflected, refracted, or scattered off surfaces. Polarization imaging can provide rich information about our surrounding world which cannot be seen by conventional image sensor and human visual system. To simultaneously measure the amplitude and polarization of incoming optical field is the goal of polarization sensing.

Figure 1:
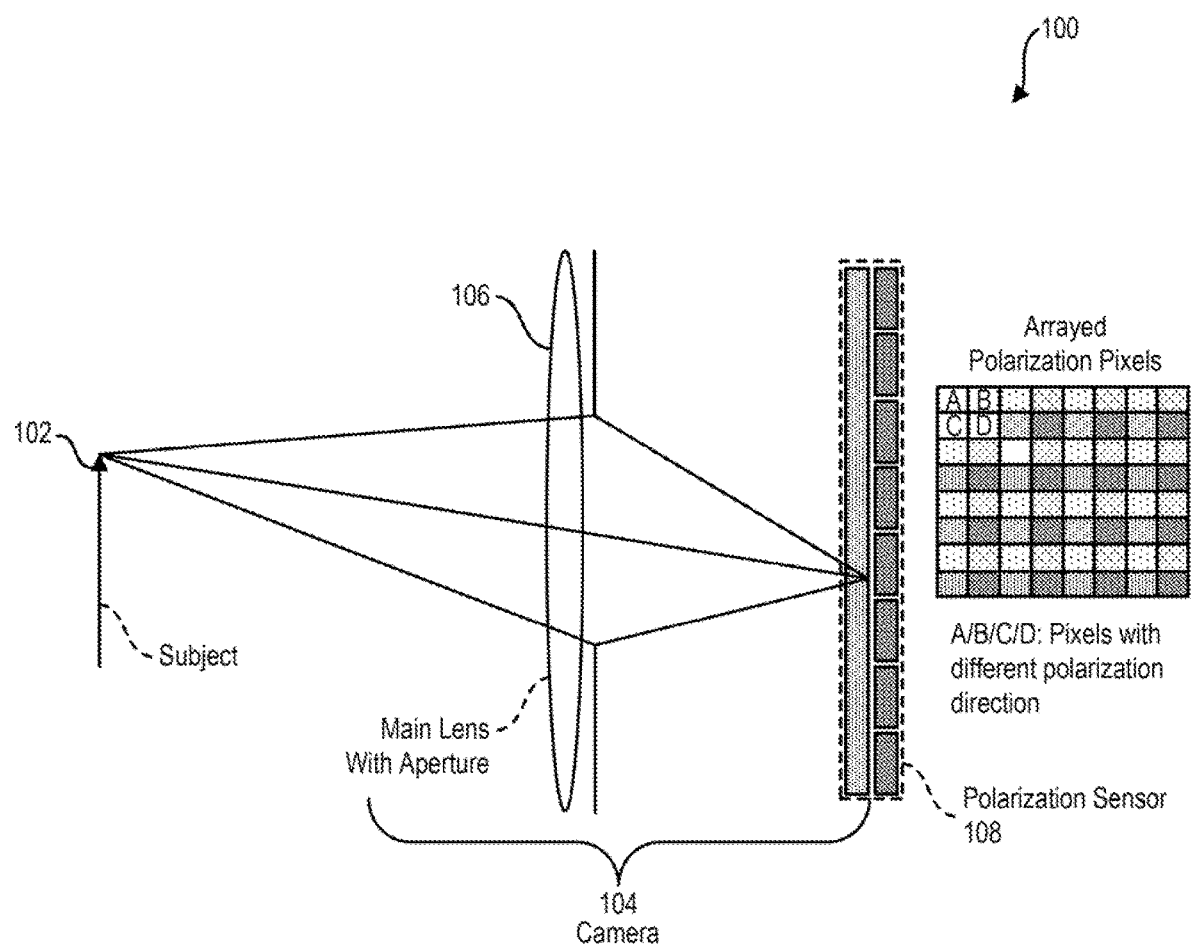
FIG. 1 illustrates the architecture of polarization imaging system.

FIG. 1 illustrates the architecture of the polarization imaging system. The architecture 100 consists of a camera 104, a lens 106 within the camera 104 and a polarization sensor 108 within the camera 104. The light beam from subject 102 focused by the main lens 106 system is recorded by the polarization image sensor 108. The focusing lens 106 in the system may be formed by a flexible transparent elastic member or a liquid lens, and the refracting power of the focusing lens 106 may be changed by changing its interface shape, so as to adjust a focus to an object. The imaging system 100 may comprise a single focus lens, zoom lens, shift lens, or the like, or may be exchangeable to other photographing optical systems having various characteristics (f-numbers (aperture values), focal lengths, and the like).

The polarization image sensor 108 that is built in the polarization camera 14 captures an intensity image and an object's partial polarization image at the same time. For that purpose, in the polarization image sensor 108, an array of fine patterned polarizers with multiple different polarization main axes is arranged on the array of image sensor 108. The semiconductor-based image detector 108 of the present invention includes a patterned polarization converter, linear polarizer and a sensor array. This sensor array can be CCD (charge-coupled image sensor) or CMOS (complementary metal oxide semiconductor (CMOS)) sensor array. The sensor pixels are arranged in an orthogonal pixel matrix on the sensor array. Advantageously, the sensor pixels form a rectangular, in particular square array.

The present disclosure provides a polarization image sensor 108 which can obtain a intensity image and polarization information at the same time. The amount of light into the camera 104 is limited by the aperture of main lens 106. The polarization image sensor 108 is similar to the colour filter array consisting of arrayed pixels with different polarization direction. FIG. 1 shows a close-up image of polarization pixels. A, B, C and D represent four pixels with four polarization direction providing a per-pixel light modulation. The polarizer array is made up of four different angled polarizers (90°, 45°, 135° and 0°) which are placed on each pixel. Every block of four pixels makes up a calculation unit.

The relationship between the different directional polarizers allows the calculation of both the degree and direction (angle) of polarization. As shown in FIG. 1, the polarization image is remapped on the photo-detector 108. For polarization sensors, adjacent pixels represent signals in different polarization directions. This imaging system 100 receives the raw data and extracts four low-resolution images with different polarization direction.

Figure 2:
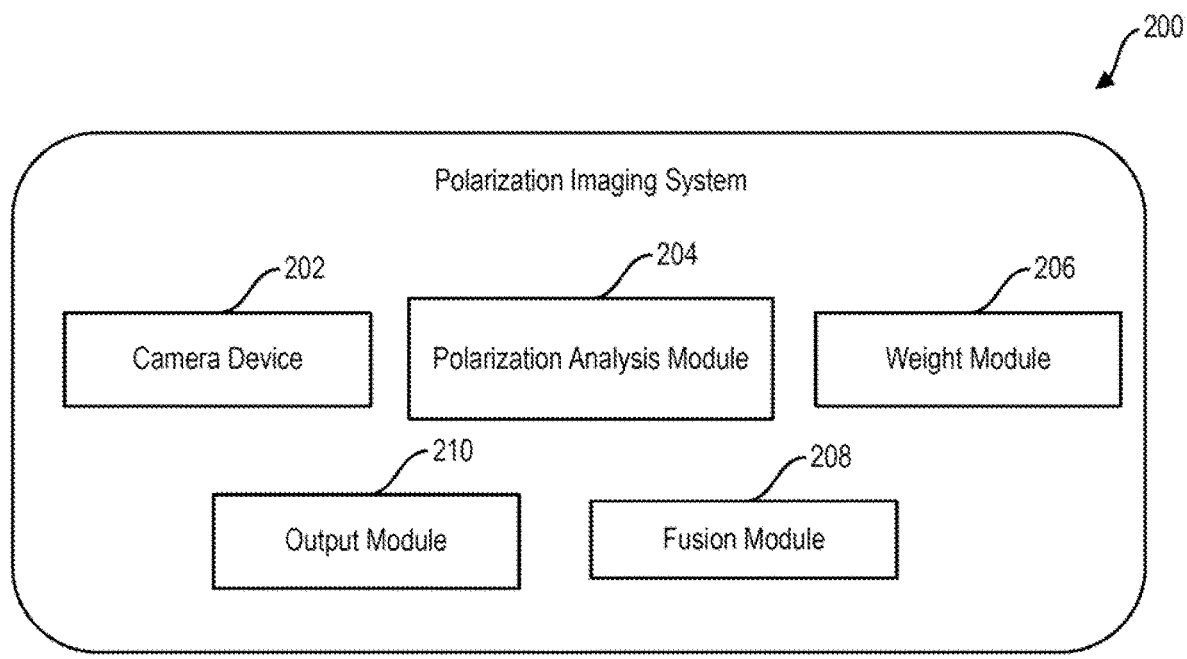
FIG. 2 illustrates a block diagram showing the Polarization super-resolution image system.

FIG. 2 illustrates the architecture of polarization imaging system. The figure illustrates an exemplary polarization super-resolution system 200) including a camera device 202, a polarization analysis module 204, a weight module 206, a fusion module 208 and an output module 210. The camera device 202 includes a main lens system and a polarization image sensor. This imaging system 200 receives raw data and extracts four low-resolution images with different polarization direction from the raw data. In the pre-processing of sub-images, bad pixels are removed and the noise level is reduced with a smooth filter.

The architecture further includes a polarization analysis module 204 which consists of an image extractor that receives and extracts one or more processed sub-images from the one or more sub-images mentioned above. The polarization analysis module 204 further includes a processor that calculates a degree of linear polarization (DOLP) and an angle of linear polarization (AOLP) for each of the one or more processed sub images.

Degree of polarization (DOP) is a quantity used to describe the portion of an electromagnetic wave which is polarized. The light is reflected by the surface of the object in polarized and unpolarized lights. The DOP of the reflected light depends on the surface condition (material, colour, roughness etc.) and the angle of reflection. The angle of polarization indicates the angle between the plane of polarization and the plane of reference. A perfectly polarized wave has a DOP of 100%, whereas an unpolarized wave has a DOP of 0%. With the information of direction of polarization, both distortions and the direction of distortion of the plane can be identified and reflections can be removed.

The weight module 206 creates weight mask based on the guided map that is calculated by the DOLP/AOLP. The weight module consists of a processor that generates a guided map based on the degree of linear polarization (DOLP) and the angle of linear polarization (AOLP) for each of the one or more processed sub images. The weight module 206 further includes a weight mask module for computing a weight mask for each of the one or more processed sub images based on the guided map. Further, the weight mask module assigns the weight mask with the one or more processed sub images to generate one or more weighted sub-images.

The fusion module 208 combines the one or more weighted sub-images via an algorithm. The super resolution image obtained is generated by the output module 210 which is in connection with the fusion module 208. The fusion module 208 employs an algorithm to combine the one or more weighted sub-images by fusion imaging wherein the fusion imaging is based on either a surface-reflection reduction or a surface normal mapping.

Figure 3:
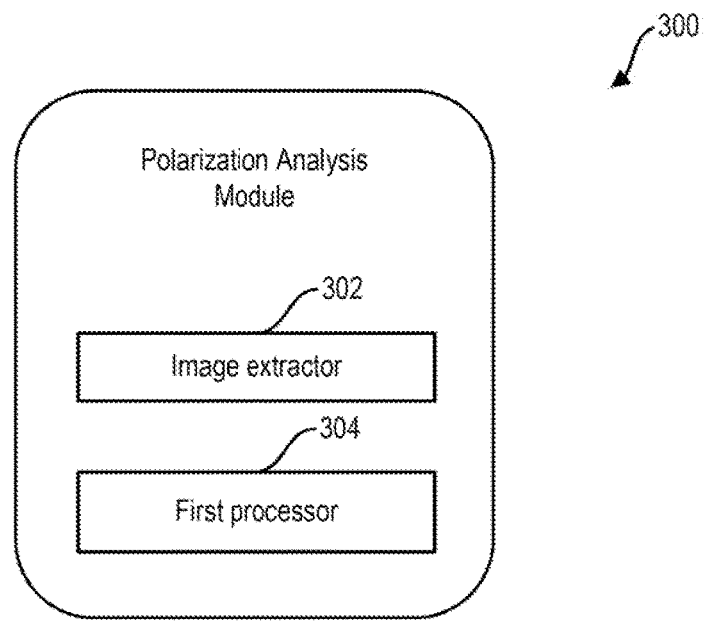
FIG. 3 illustrates a polarization analysis module within the polarization super-resolution image system.

FIG. 3 illustrates a polarization analysis module within the polarization super-resolution image system. The polarization analysis module 300 consists of an image extractor 302 which receives and extracts one or more processed sub-images from the one or more low resolution sub-images that are obtained from the polarization sensor. Further, the polarization analysis module includes a processor 304 that calculates a degree of linear polarization (DOLP) and an angle of linear polarization (AOLP) for each of the one or more processed sub images. The processor 304 may be present inside a computing device, for example, a personal computer, an embedded computer, a single board computer (e.g. Raspberry Pi or similar), a portable computation device (e.g. tablet), a controller, or any other computation device or system of devices capable of performing the functions described herein.

The polarization analysis module 300 generates DOLP/AOLP maps based on the sub-images. (DOP) is a quantity used to describe the portion of an electromagnetic wave which is polarized while the angle of polarization indicates the angle between the plane of polarization and the plane of reference. According to the Polarization maps, a guided mask is generated.

Figure 4:
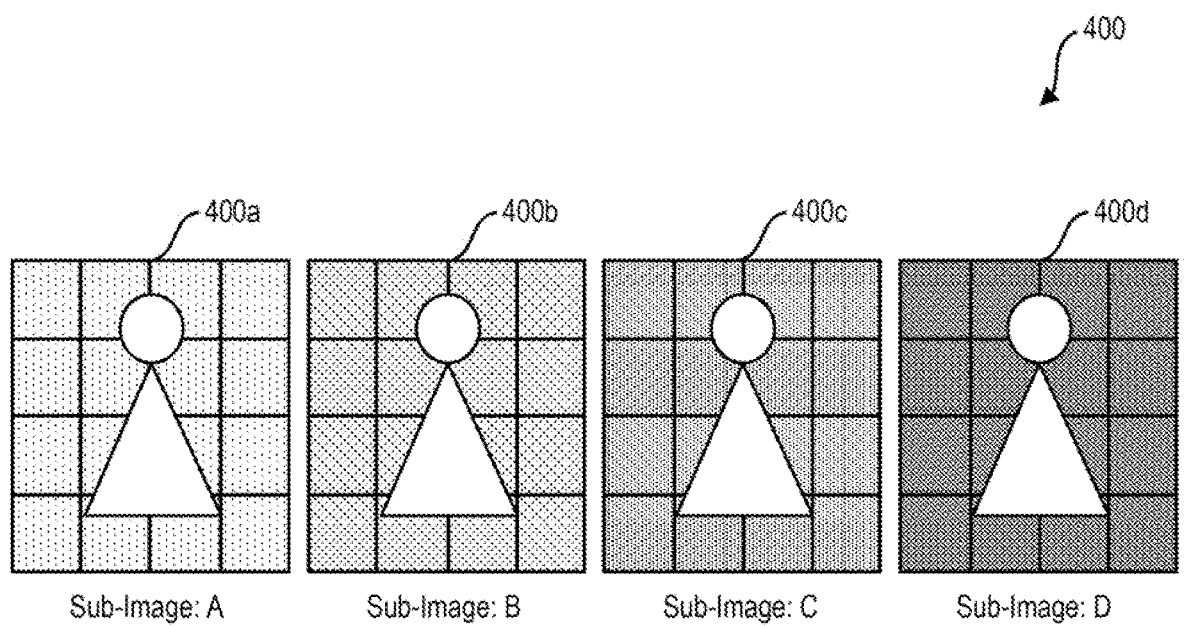
FIG. 4 illustrates four sub-images generated by the polarization analysis module.

FIG. 4 illustrates four sub-images generated by the polarization analysis module. The four sub images 400 extracted are shown as 400a (sub-image A). 400b (sub-image B), 400c (sub-image C), 400d (sub-image D). The polarization state of light beams is represented by the Stokes vector. These vectors can be characterized from the light intensity at 0°, 45°, 90°, 135'. Two parameters, the degree of linear polarization (DOLP) and the angle of polarization (AOLP), are estimated from the Stokes vectors. These parameters facilitates in various fusion imaging, such as surface-reflection reduction, surface normal mapping. As shown in the equation given below, the polarization state of light beams is represented by the Stokes vector. These vector can be characterized from the light intensity at 0°, 45°, 90π, 135°, Two parameters, the degree of linear polarization (DOLP) and the angle of polarization (AOLP), are estimated from the Stokes vectors. These parameters facilitates in various fusion imaging, such as surface-reflection reduction, surface normal mapping.

$$S = \begin{bmatrix} S_0 \\ S_1 \\ S_2 \end{bmatrix} = \begin{bmatrix} I_{total} \\ I_{total} P\cos(2\phi) \\ I_{total} P\sin(2\phi) \end{bmatrix} = \begin{bmatrix} \frac{1}{2}(I_0 + I_{45} + I_{90} + I_{135}) \\ I_0 - I_{90} \\ I_{45} - I_{135} \end{bmatrix} \quad (1)$$

$$P = \frac{\sqrt{S_1^2 + S_2^2}}{S_0}, \phi = \frac{1}{2}\arctan\left(\frac{S_2}{S_1}\right) \quad (2)$$

The polarization analysis module generates DOLP/AOLP maps based on the sub-images. According to the Polarization maps, a guided mask is generated. The guided mask represents the image segmentation with different polarization degree.

Figure 5:
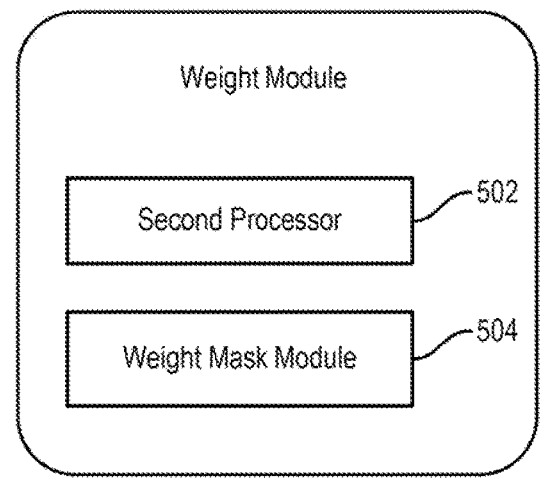
FIG. 5 illustrates a weight module within the polarization super-resolution image system.

FIG. 5 illustrates a weight module within the polarization super-resolution image system. The weight module 500 creates weight mask based on the guided map that is calculated by the DOLP/AOLP. The weight module 500 includes a processor 502 that generates a guided map based on the degree of linear polarization (DOLP) and the angle of linear polarization (AOLP) for each of the one or more processed sub images.

The weight module further includes a weight mask module 504 for computing a weight mask for each of the one or more processed sub images based on the guided map. Further, the weight mask module 504 assigns the weight mask with the one or more processed sub images to generate one or more weighted sub-images.

Figure 6:
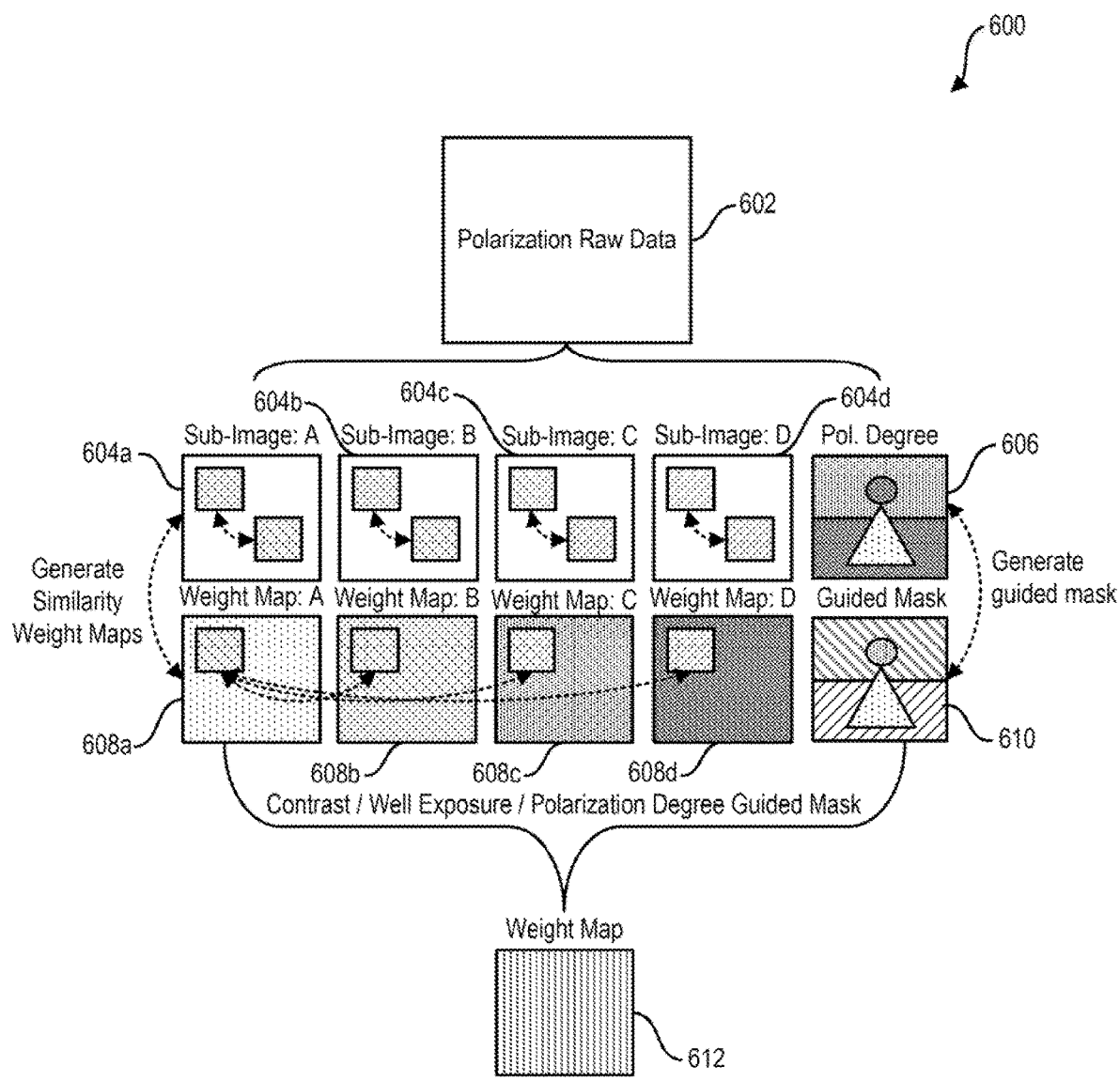
FIG. 6 illustrates the weight module in accordance with the present invention.

FIG. 6 illustrates the weight module in accordance with the present invention. The architecture depicts the polarized raw data 602 from which four sub-images 604 are generated. The four sub-images 604a, 604b, 604c and 604d combine to generate a polarized degree image 606 as shown in FIG. 6. For each of the four sub-images 604a, 604b, 604c, 604d, the weight module generates a weight map 608a, 608b, 608c and 608d respectively. Weight Map A 608a, Weight Map B 608b, Weight Map C 608c and Weight Map D 608d are generated based on the guide map 610 calculated by DOLP/AOLP. Further, a combined weight map 612 is formed based on the guide map 610.

When the difference of adjacent pixels intensity is small (DOLP≈Lthre), high spatial resolution image reconstruction is achieved. With high polarization degree (DOLP≈Hthre), the reflection can be removed by selecting different weights for image fusion. When the Lthre<DOLP <Hthre, the information of four sub-images (604a-604d) can be used to estimate super-resolution image. From the polarization raw image, a set of low-resolution sub-images with different polarization state {Sub-Image: A, B, C, D} are given as mentioned earlier. To get the high resolution image, we can employ the patch redundancy of nature image in the same scale of same sub-image and the cross patch of different sub-image facilitated by the guided mask. This method can be translated to the following algorithm. For each block in the sub-image i (i can be A, B, C and D) its self-similarity patch can be found in the same image i and compute their similarity using the following equation.

$$D_2(u,v) = \|T - I\|_2^2 = \sum_{x=0}^{n-1}\sum_{y=0}^{n-1}(T(x,y) - I(x+u, y+v))^2 \quad (3)$$

$$\mathrm{argmin} D_2(u,v) = \underset{(u,v)}{\mathrm{argmin}}\sum_{x=0}^{n-1}\sum_{y=0}^{n-1}(T(x,y) - I(x+u, y+v))^2 \quad (4)$$

We can find the similarity patches {SP1, SP2, SP3, ... } by computing the squared L2 distance between the template image $T_{m/m}$ and the same patch in the search window $I_{m/m}$, where m>n. Then, a set of similarity patches {{PA, SPA1, SPA2, SPA3, ... } {PB, SPB1, SPB2, SPB3, ... } {PC, SPC1, SPC2, SPC3, ... } {PD, SPD1, SPD2, SPD3, ... },} in the same location in sub-image A, B, C, D are obtained. To get the sub-pixel accurate translation, distance map of each patch can also be obtained by minimize the L2 distance of sub-windows between template and query location (Eq. 4).

Figure 7:
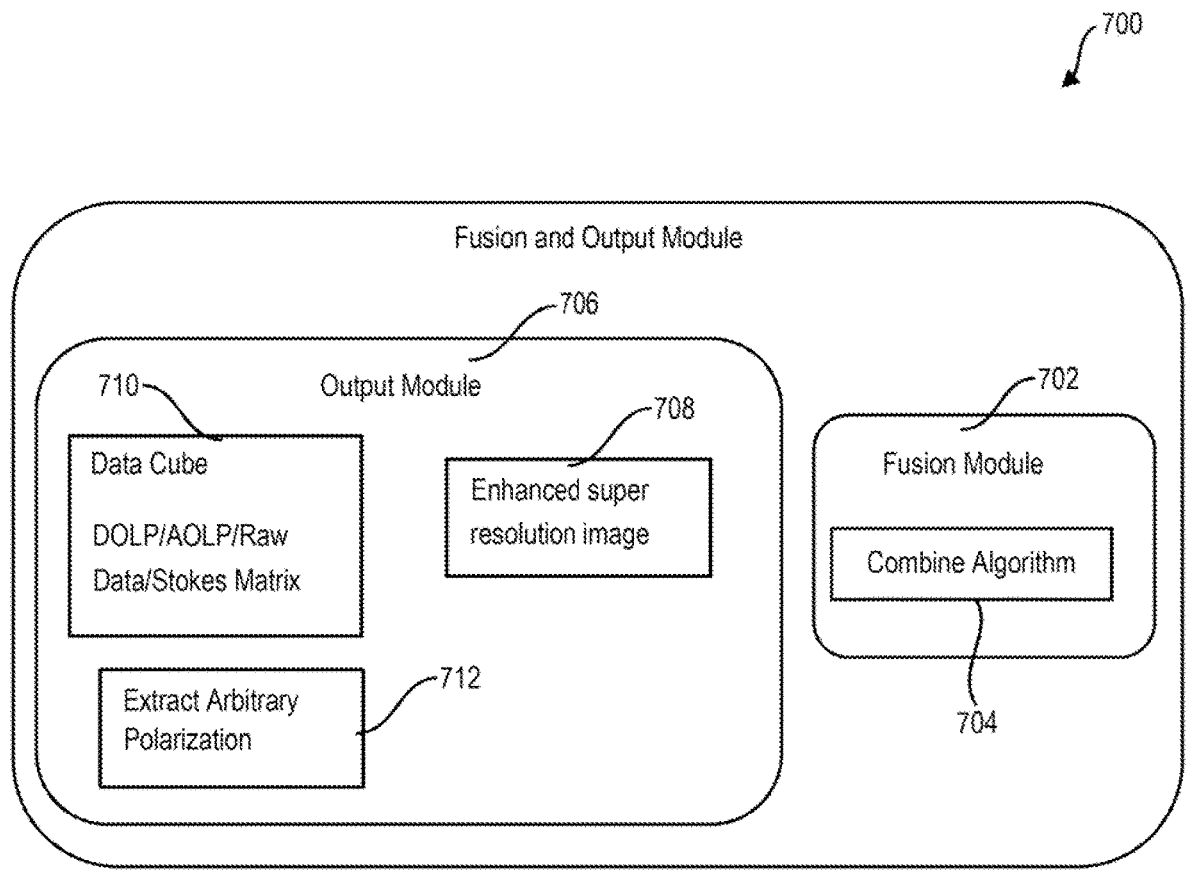
FIG. 7 illustrates a fusion and output module within the polarization super-resolution image system.

FIG. 7 illustrates a fusion and output module within the polarization super-resolution image system. The fusion and output module 700 of the polarization imaging system consists of a fusion module 702 and an output module 706. The fusion module combines the one or more weighted sub-images to generate a super resolution image. The fusion module 702 does so by employing an algorithm 704 to combine the one or more weighted sub-images by fusion imaging wherein the fusion imaging is based on either a surface-reflection reduction or a surface normal mapping.

The fusion module 702 is connected to an output module 706 that produces the final super resolution image 708 as shown in FIG. 7. The enhanced super resolution image with detail information can be obtained by the fusion module 702. An image with arbitrary polarization 712 can also be achieved by the Data cube 710 as shown in FIG. 7.

Figure 8:
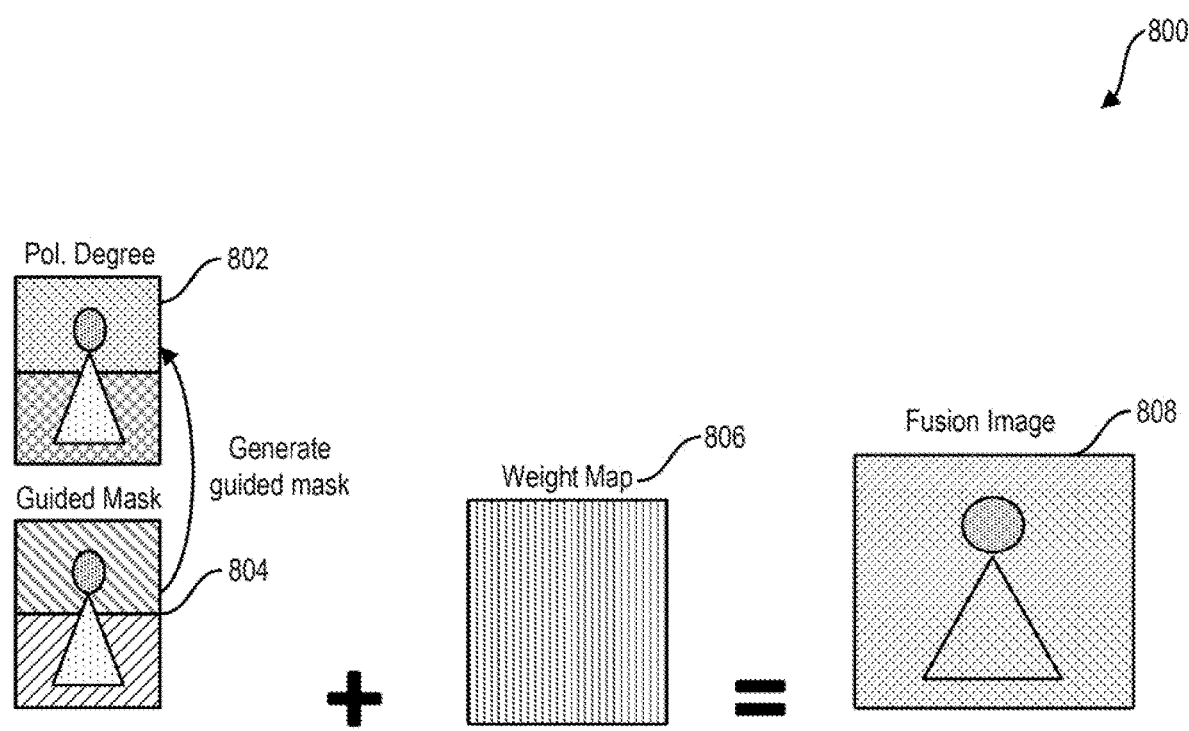
FIG. 8 illustrates the fusion and output module in accordance with the present invention.

The goal of super-resolution fusion 800 is to provide a method to estimate an enhanced super-resolution image 808 from a single polarization raw data. In a nutshell, the sub images combine to form a polarization degree image 802 as described earlier. A guided mask 804 based on the polarized degree image 802 is assigned a weight map 806 to produce the super resolution image 808 as depicted in FIG. 8.

Assuming sufficient patches and sub-pixel translation are obtained (described earlier), fusion them with selected weight. For each block in the reference sub-image its similarity patch is found in the rest of sub-images. A new set of weight maps $w_{n,i}$ can be generated based on the brightness under the guided map, where n is the patch number and i represent the i-th block image. As shown in the following, the weight map is a function of pixel intensity and self-similarity. When computing the fusion image, the pixel under well exposure and high similarity should be more.

$$w_{n,i} = f(I_n, D_n) \quad (5)$$

The weight among the various polarized image can be achieved by the distance between the patch intensity In and the target intensity Itar. The weight among the similarity patches are determined by the self-similarity distance of similar patches Dn. Given the subpixel translation, an enhanced super-resolution image HR will be obtained after fusion with equation (6).

$$HR(x, y) = \frac{\sum_n \sum_i w_{n,j} \cdot M \cdot LR(x, y)_{n,i}}{\sum_n \sum_i w_{n,i}} \quad (6)$$

To preserve the detail information and well exposure area with high resolution is the objective of the fusion algorithm. The enhanced super-resolution image is obtained by merging the polarization sub-images under weight map.

Figure 9:
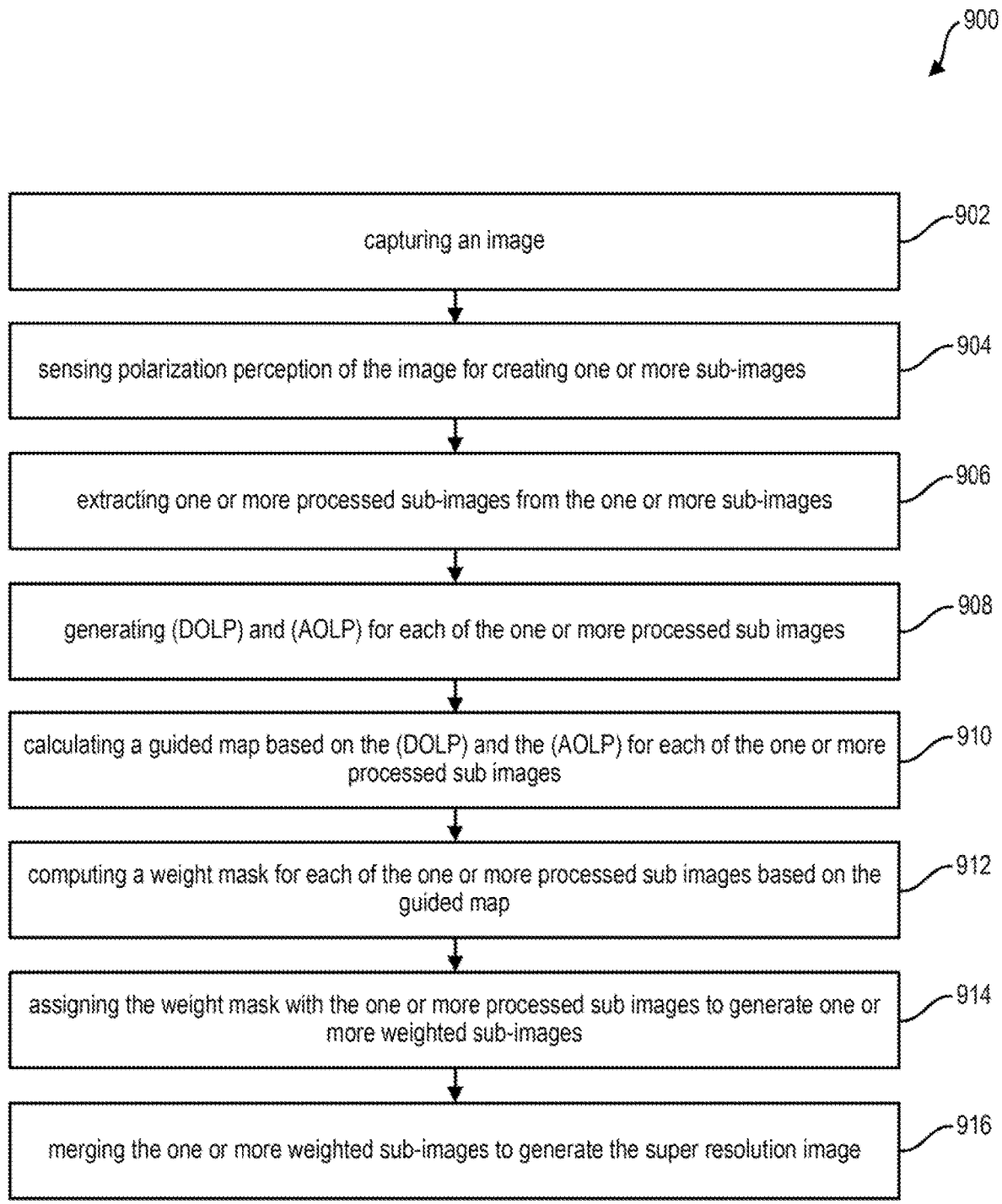
FIG. 9 illustrates a method for generating a super resolution image.

FIG. 9 illustrates a method for generating a super resolution image as depicted by the flowchart 900. The method includes capturing the image of a subject placed in front of the camera 902. The amount of light entering into the camera can be limited by the aperture of main lens of the camera. The next step includes sensing polarization perception of the image of the subject for creating one or more low resolution sub-images 904 with the help of a polarization sensor. The polarization image sensor is a CMOS sensor that is similar to a colour filter array consisting of arrayed pixels with different polarization direction. A close-up image of polarization pixels A, B, C and D representing four pixels with four polarization directions has been shown and described previously. Next, one or more processed sub-images are extracted from the one or more sub-images 906 with the help of an image extractor. In the pre-processing of sub-images, bad pixels are removed: the noise level is reduced with a smooth filter.

The next step includes calculating degree of linear polarization (DOLP) and an angle of linear polarization (AOLP) for each of the one or more processed sub images 908. A guided map is then generated in step 910 based on the calculated degree of linear polarization (DOLP) and the angle of linear polarization (AOLP) for each of the one or more processed sub images. Further, a weight mask is computed for each of the one or more processed sub images based on the guided mask 912. Next, the weight mask is assigned to one or more processed sub images to generate one or more weighted sub-images 914. Finally, in step 916, the one or more weighted sub-images are merged to generate the super resolution image.

Figure 10:
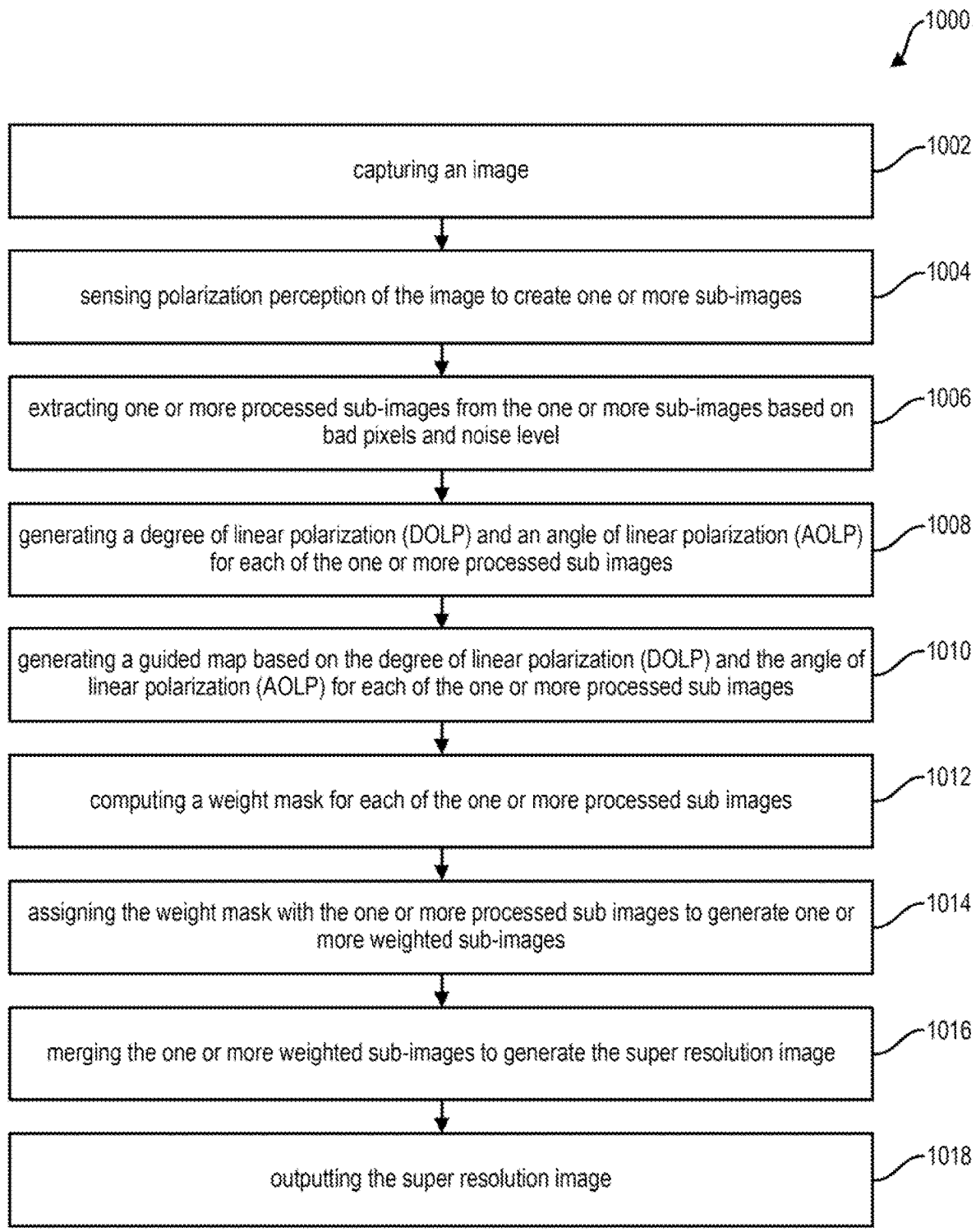
FIG. 10 illustrates a method for producing a super resolution image by polarization.

FIG. 10 illustrates a method for producing a super resolution image by polarization as depicted by the flowchart 1000. The flowchart method includes capturing the image of a subject placed in front of the camera 1002. The amount of light entering into the camera can be limited by the aperture of main lens of the camera. The next step includes sensing polarization perception of the image of the subject for creating one or more low resolution sub-images 1004 with the help of a polarization sensor. The polarization image sensor is a CMOS sensor that is similar to a colour filter array consisting of arrayed pixels with different polarization direction. A close-up image of polarization pixels A, B, C and D representing four pixels with four polarization directions has been shown and described previously. Next step includes extracting one or more processed sub-images from the one or more sub-images 1006 with the help of an image extractor. In the pre-processing of sub-images, bad pixels are removed and the noise level is reduced with a smooth filter.

The next step includes calculating degree of linear polarization (DOLP) and an angle of linear polarization (AOLP) for each of the one or more processed sub images 1008. A guided map is then generated in step 1010 based on the calculated degree of linear polarization (DOLP) and the angle of linear polarization (AOLP) for each of the one or more processed sub images. Further, a weight mask is computed for each of the one or more processed sub images based on the guided mask 1012. Next, the weight mask is assigned to one or more processed sub images to generate one or more weighted sub-images 1014. Finally, in step 1016 the one or more weighted sub-images are merged to generate the super resolution image. The output module is responsible for outputting the final super resolution image in the last step 1018.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A polarization imaging system for generating a super resolution image, wherein the polarization imaging system comprising:
   a camera for capturing an image, wherein the camera comprising:
      a lens; and
      a polarization image sensor, wherein the polarization image sensor senses polarization perception of the image for creating one or more sub-images;
   a polarization analysis module, wherein the polarization analysis module comprising:
      an image extractor, wherein the image extractor receives and extracts one or more processed sub-images from the one or more sub-images; and
      a first processor, wherein the first processor calculates a degree of linear polarization (DOLP) and an angle of linear polarization (AOLP) for each of the one or more processed sub images;
   a weight module, wherein the weight module comprising:
      a second processor, wherein the second processor generates a guided map based on the degree of linear polarization (DOLP) and the angle of linear polarization (AOLP) for each of the one or more processed sub images,
a weight mask module, wherein the weight mask module computes a weight mask for each of the one or more processed sub images based on the guided map, further wherein the weight mask module assigns the weight mask with the one or more processed sub images to generate one or more weighted sub-images; and
a fusion module, wherein the fusion module combines the one or more weighted sub-images to generate the super resolution image.

2. The polarization imaging system in accordance with claim 1, wherein the degree of linear polarization (DOLP) and the angle of polarization (AOLP) are based on the Stokes vectors.

3. The polarization imaging system in accordance with claim 1, wherein the fusion module combines the one or more weighted sub-images by fusion imaging.

4. The polarization imaging system in accordance with claim 3, wherein the fusion imaging is based on either a surface-reflection reduction or a surface normal mapping.

5. The polarization imaging system in accordance with claim 1, wherein the one or more sub-images are low-resolution intensity images with different polarization direction.

6. The polarization imaging system in accordance with claim 1, wherein the fusion module is an algorithm for combining the one or more weighted sub-images.

7. The polarization imaging system in accordance with claim 6, wherein the algorithm preserves detail information and well exposure area of the super resolution image.

8. A imaging processing system for producing a super resolution image by polarization, wherein the imaging processing system comprising:
an electronic device for capturing an image, wherein the electronic device comprising:
a camera with a lens; and
at least one polarization image sensor with an array of pixels with different polarization direction, wherein the at least one polarization image sensor senses polarization perception of the image for creating one or more sub-images;
a polarization analysis module, wherein the polarization analysis module comprising:
an image extractor, wherein the image extractor receives and extracts one or more processed sub-images from the one or more sub-images; and
a first processor, wherein the first processor calculates a degree of linear polarization (DOLP) and an angle of linear polarization (AOLP) based on analysis of stokes vectors for each of the one or more processed sub images;
a weight module, wherein the weight module comprising:
a second processor, wherein the second processor generates a guided map based on the degree of linear polarization (DOLP) and the angle of linear polarization (AOLP) for each of the one or more processed sub-images, further wherein the second processor calculates the guided map based pixel intensity and similarity of the one or more processed sub images;
a weight mask module, wherein the weight mask module computes a weight mask for each of the one or more processed sub images based on the guided map, further wherein the weight mask module assigns the weight mask with the one or more processed sub images to generate one or more weighted sub-images; and
a fusion module, wherein the fusion module merges the one or more weighted sub-images to form a super resolution image; and
an output module, wherein the output module provides the super resolution image by polarization.

9. The imaging processing system in accordance with claim 8, wherein the at least one polarization image sensor includes a plurality of polarization direction channels.

10. The imaging processing system in accordance with claim 9, wherein the polarization direction channels are four.

11. The imaging processing system in accordance with claim 8, wherein the one or more sub-images are low-resolution intensity images with different polarization direction.

12. The imaging processing system in accordance with claim 8, wherein the stokes vectors represents polarization level of light beams.

13. The imaging processing system in accordance with claim 12, wherein the Stokes vectors are characterized from light intensity of the light beams at different angles.

14. The imaging processing system in accordance with claim 13, wherein different angles are 0°, 45°, 90°, 135°.

15. The imaging processing system in accordance with claim 8, wherein the degree of linear polarization (DOLP) and the angle of linear polarization (AOLP) form a data cube.

16. The imaging processing system in accordance with claim 15, wherein the data cube performs arbitrary polarization on the one or more sub-images.

17. A method for generating a super resolution image, wherein the method comprising:
capturing an image;
sensing polarization perception of the image for creating one or more sub-images;
extracting one or more processed sub-images from the one or more sub-images;
generating a degree of linear polarization (DOLP) and an angle of linear polarization (AOLP) for each of the one or more processed sub images;
calculating a guided map based on the degree of linear polarization (DOLP) and the angle of linear polarization (AOLP) for each of the one or more processed sub images,
computing a weight mask for each of the one or more processed sub images based on the guided map,
assigning the weight mask with the one or more processed sub images to generate one or more weighted sub-images; and
merging the one or more weighted sub-images to generate the super resolution image.

18. A method for producing a super resolution image by polarization, wherein the method comprising:
capturing an image;
sensing polarization perception of the image to create one or more sub-images;
extracting one or more processed sub-images from the one or more sub-images based on bad pixels and noise level;
generating a degree of linear polarization (DOLP) and an angle of linear polarization (AOLP) for each of the one or more processed sub images based on stokes vectors;

generating a guided map based on the degree of linear polarization (DOLP) and the angle of linear polarization (AOLP) for each of the one or more processed sub images;

computing a weight mask for each of the one or more processed sub images based on the guided map;

assigning the weight mask with the one or more processed sub images to generate one or more weighted sub-images;

merging the one or more weighted sub-images to generate the super resolution image; and outputting the super resolution image.

* * * * *